United States Patent [19]
Keith

[11] Patent Number: 5,847,643
[45] Date of Patent: Dec. 8, 1998

[54] APPARATUS FOR INDICATING MOTOR VEHICLE IMPACT

[76] Inventor: William B. Keith, 1302 Pilot Point Dr., Houston, Tex. 77038

[21] Appl. No.: 839,717

[22] Filed: Apr. 15, 1997

[51] Int. Cl.⁶ ................................................ B60Q 1/00
[52] U.S. Cl. .................... 340/436; 340/590; 340/598; 340/665; 180/274; 200/DIG. 10; 307/10.1
[58] Field of Search ................................... 340/436, 437, 340/932.2, 590, 598, 665–667; 180/274, 271; 200/61.44, 61.45 R, 61.53, DIG. 10; 307/10.1

[56] References Cited

U.S. PATENT DOCUMENTS

| | | | |
|---|---|---|---|
| 2,508,149 | 5/1950 | Eliassen | 200/52 |
| 4,683,974 | 8/1987 | Richardson | 180/274 |
| 4,802,548 | 2/1989 | Kausch | 180/274 |
| 4,977,388 | 12/1990 | Park | 340/436 |
| 5,392,024 | 2/1995 | Kiuchi et al. | 340/436 |
| 5,408,214 | 4/1995 | Chalmers et al. | 340/436 |

Primary Examiner—Donnie L. Crosland
Attorney, Agent, or Firm—Mark R. Wisner

[57] ABSTRACT

A honk strip comprising an electrical power source, electrical leads, electrically conducting members and an alarm. The honkstrip being useful for detecting vehicular impact with other objects and signaling a vehicle operator that an impact has occurred.

17 Claims, 5 Drawing Sheets

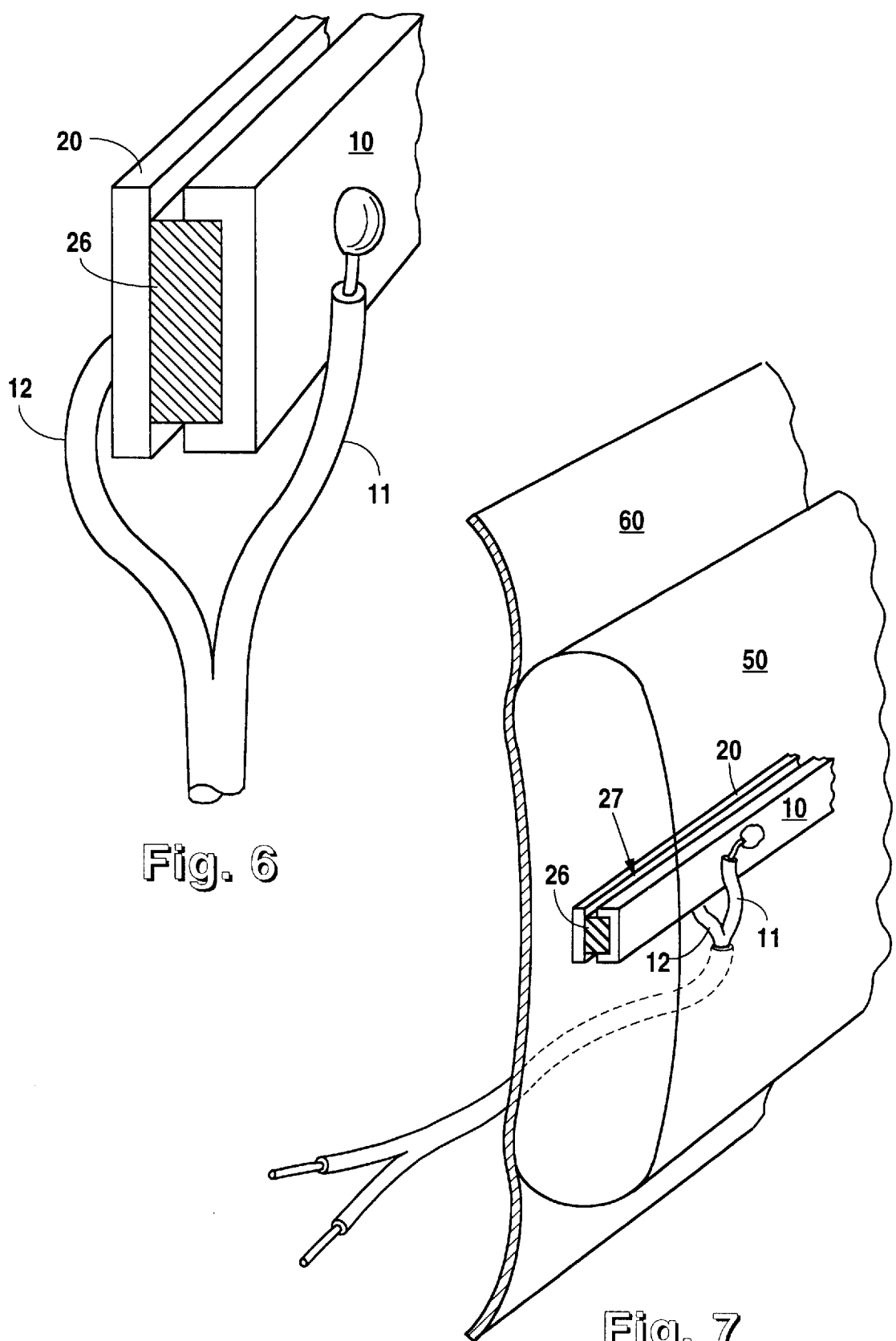

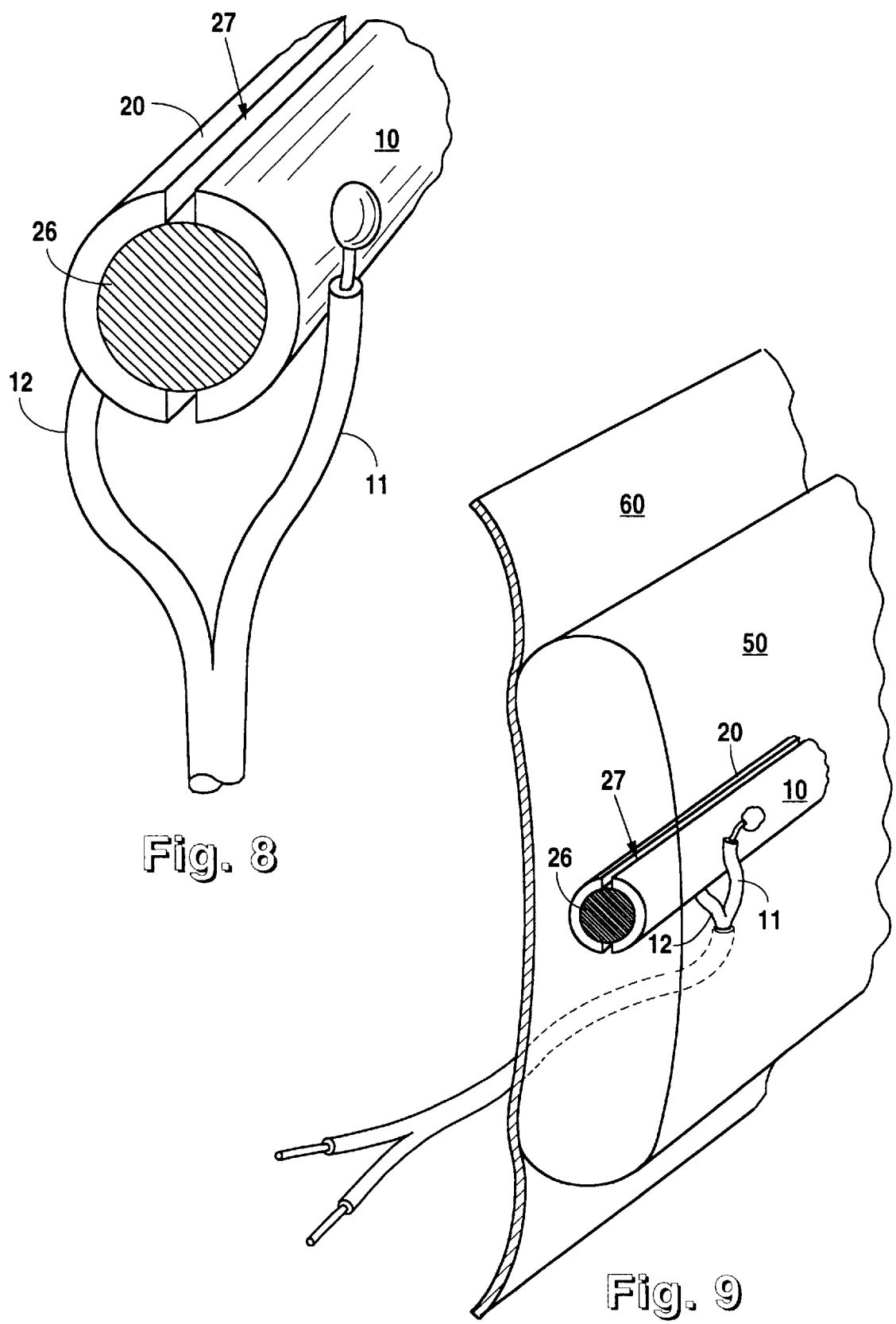

APPARATUS FOR INDICATING MOTOR VEHICLE IMPACT

BACKGROUND OF THE INVENTION

The subject invention is related to an apparatus that detects motor vehicle collisions with other objects, and activates an alarm indicating a collision has occurred. The subject invention is more directly related to a honk strip that can be adhered to a motor vehicle, and relay a warning when a vehicle impact has occurred.

DESCRIPTION OF THE PRIOR ART

Apparatus for detecting a vehicle impact was known from U.S. Pat. No. 5,408,214. This invention employed a plurality of telescoping members protruding from various locations of a vehicle. When the outer surface of a telescoping member was sufficiently compressed from an impact, sensors inside the telescoping member were activated. Once activated, the sensors then generated an alarm to be perceived by the vehicle's driver.

The present invention also uses a mechanical to electrical transducing apparatus, however the present invention employs a mechanical device requiring minimum deformation before vehicle collision indicating sensors are activated. Also, the present invention can be installed in an inconspicuous fashion resulting in a cosmetically more appealing application. Finally, the present invention can be installed by the vehicle manufacturer or reseller, or purchased at any auto parts store and retro-fitted by the owner.

SUMMARY OF THE INVENTION

The subject invention is related to an apparatus for detecting when a motor vehicle impacts other objects an activating an alarm indicating that a collision has occurred. The subject invention is more directly related to a honk strip that can be combined with a motor vehicle, and when a vehicle impacts another object, warns the driver that a collision has occurred.

When operating a motor vehicle many stationary or nonstationary objects may be obstructed from the driver's view. Without visual detection the driver may collide with these unseen objects, possibly causing damage to the vehicle, the object or both. The present invention teaches that a device may be installed onto a vehicle that is capable of detecting a collision between a vehicle and another object, then alerting the driver of the collision. By prompt notification of a collision the driver may take appropriate action to minimize damage caused by the collision. This device is especially helpful when the vehicle itself obstructs the driver's vision, or when the driver cannot discern the distance between the vehicle and other visible objects, such as other vehicles or garage structure.

Other objects and features of the invention will be readily apparent from the accompanying drawings and description.

BRIEF DESCRIPTION OF THE DRAWINGS

FIG. 6 portrays alternative configurations of the electrically conducting members of FIG. 2 in combination with a spacer.

FIG. 7 is a cross-sectional view of the component parts of an alternative embodiment of the present invention encased in molding and attached to a vehicle bumper.

FIG. 8 illustrates yet another alternative configuration of the electrically conducting members of FIG. 2 in combination with a spacer.

FIG. 9 is a cross-sectional view of the component parts of another alternative embodiment of the present invention encased in molding and attached to a vehicle bumper.

DETAILED DESCRIPTION OF THE DRAWINGS

Figure 1:
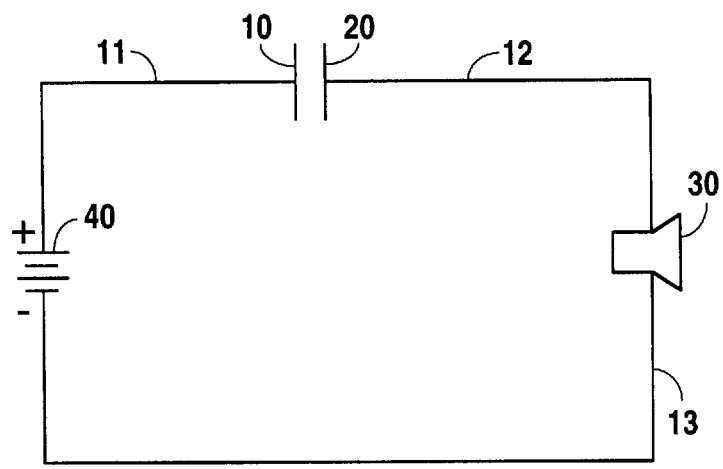
FIG. 1 is a schematical view of the electrical circuit of the apparatus of the present invention.

Referring to FIG. 1, a preferred embodiment of the apparatus of the present invention is comprised of a first electrically conducting member 10, and a second electrically conducting member 20. An alarm 30 is depicted in electrical communication with the second electrically conducting member 20 via an electrical lead 12. Also depicted in FIG. I is the electrical power source 40 in electrical communication with the alarm 30 and the first electrically conducting member 10; electrical communication is accomplished through electrical leads 11 and 13 respectively.

The electrical power source 40 can be a 12 volt battery, typically found on most motor vehicles. The first and second electrically conducting members 10 and 20, must be electrically conducting. It is preferable that they be elastically deformable, i.e. able to be easily deformed, and yet voluntarily return to their original shape. The electrically conducting members 10 and 20, as well as electrical leads 11, 12 and 13, can be made from any electrically conducting material, preferably copper, and have round, flat, or any one of many other cross-sections. The electrical leads 11, 12 and 13 can be any standard applicable electrical wiring that will meet the requirements to be sufficiently rugged, without being prohibitively expensive. The alarm 30 can be any signal emitting device—possibilities include a light visible to the operator of the vehicle, or a horn that is typically provided with most vehicles.

Figure 2:
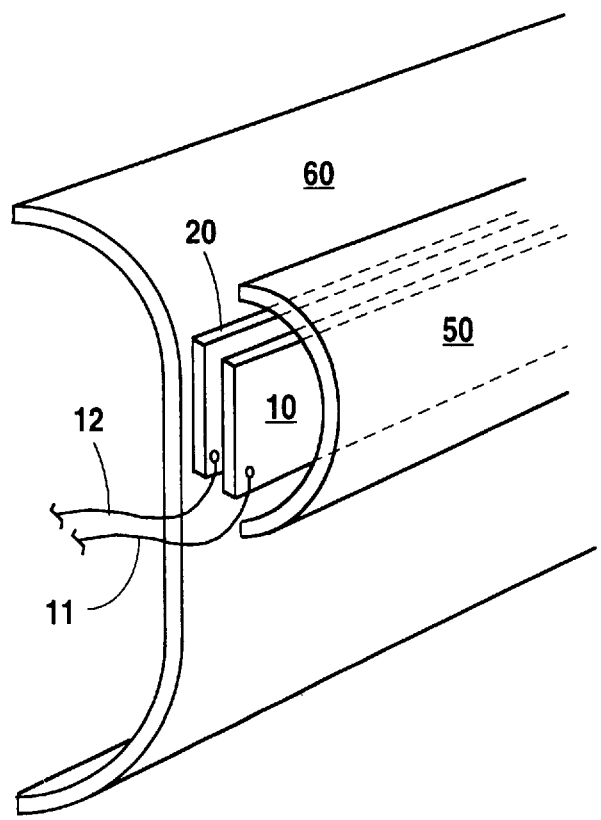
FIG. 2 is a cross-sectional view of the component parts of a preferred embodiment of the present invention encased in molding and attached to a vehicle bumper.

FIG. 2 illustrates a representative cross-sectional view of the first and second electrically conducting members 10 and 20 adjacently disposed to a vehicle bumper 60. For cosmetic purposes a vehicle molding strip 50 may be installed around members 10 and 20. It is preferred that the molding strip 50 be pliable, and fit close to members 10 and 20. In a preferred embodiment members 10 and 20 are embedded in the molding strip 50 during fabrication. If excessive space exists between the strip 50 and member 10 the response time to activate the alarm 30 may be increased. It is desired to minimize this time to provide a prompt warning to the vehicle operator, or any other pertinent personnel.

Figure 3:
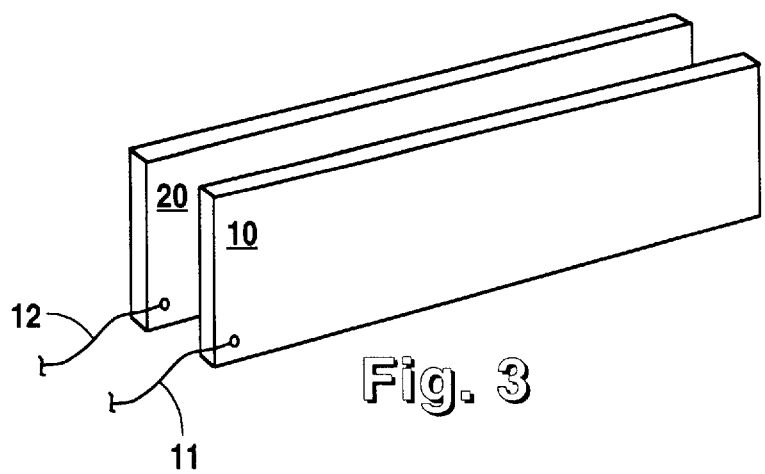
FIG. 3 illustrates the electrically conducting members of the apparatus of FIG. 2 in the open position.

FIG. 3 depicts the electrically conducting members 10 and 20 in a noncontacting, at rest position. In the at rest position, it is preferred that members 10 and 20 be adjacent and spatially proximate. Members 10 and 20 can have a multiple number of length vs. height ratios.

Figure 4:
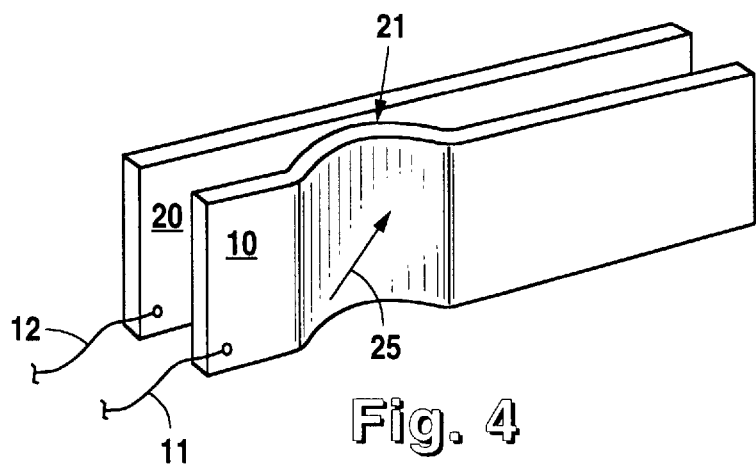
FIG. 4 illustrates the electrically conducting members of the apparatus of FIG. 2 in the closed position.

FIG. 4 illustrates electrically conducting members 10 and 20 in a contacting position. This occurs when an external force 25 is applied to member 10 and sufficiently deforms it until member 10 contacts member 20 to produce a contact point 21. The contact point allows the electrical circuit to close thus activating alarm 30. When force 25 is removed, the elasticity of member 10 returns it to its noncontacting position as shown in FIG. 3 and deactivates alarm 30. It is anticipated that the external force 25 results from the subject vehicle impacting another object.

Figure 5:
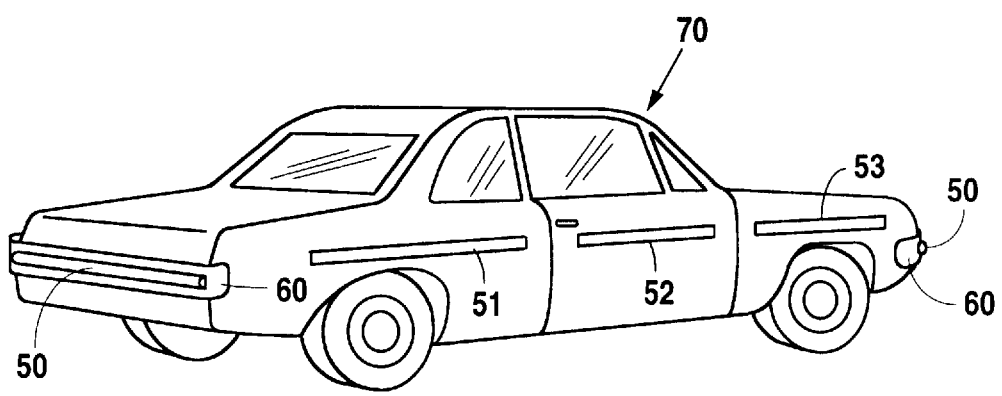
FIG. 5 depicts potential applications of the apparatus of FIG. 2 on a vehicle.

FIG. 5 is a perspective view illustrating the apparatus of the present invention in combination with a vehicle 70. In this application electrically conducting members 10 and 20, while connected to the electrical circuit of FIG. 1, are concealed from view by molding strips 50, 51, 52 and 53. Since members 10 and 20 are positioned under the molding strips, a sufficient external impact upon the strips can force members 10 and 20 into their contacting position, thus providing an electrical signal to alarm 30. Therefore, external forces applied to molding strips 50, 51, 52 or 53 can produce an alarm response. Strips 50 can respond when impacts occur on the front or rear bumpers 60. This may occur while parking - by the operator of the subject vehicle 70 or by other vehicles impacting the subject vehicle. Strips 51, 52, and 53 can help to provide warning from any side impacts, which may occur when the vehicle operator opens his or her door, when occupants of other vehicles open their doors, or by careless pedestrians.

FIG. 6 demonstrates how members 10 and 20 are kept separate in their at rest position without hindering contact between members 10 and 20 during a vehicle impact. This involves positioning a spacer 26 between members 10 and 20. The spacer 26 should be produced from material pliable enough to sufficiently deform under stress, yet resilient enough to separate members 10 and 20 when the stress is removed. The spacer 26 material should also possess the requisite toughness to withstand repeated deformations without sacrificing resilience. Suitable materials could comprise rubber, vinyl, silicone, felt or some nonconducting springs.

FIG. 6 also illustrates an alternative configuration for members 10 and 20. In the alternative configuration, member 20 has a rectangular cross-section, while member 10 has a channel cross-section. During spacer 26 compression the channel ends of member 10 are forced towards and against member 20 to close the circuit of FIG. 1 and provide an alarm response.

FIG. 7 demonstrates how members 10 and 20, having the alternate configuration of FIG. 6, are embedded inside vehicle molding strip 50. Although it is preferred that the combination of members 10 and 20 with molding strip 50 be fabricated by the manufacturer, this combination could also be retrofitted.

FIG. 8 depicts yet another possible cross-sectional configuration for members 10 and 20. Here each member has a hemispherical cross-section, and is kept apart by spacer 50. The function here is identical to that described in FIG. 6. FIG. 9 illustrates members 10 and 20 having the alternate design of FIG. 8 while encased in molding 50 adjacent to a car door 60.

Figure 10:
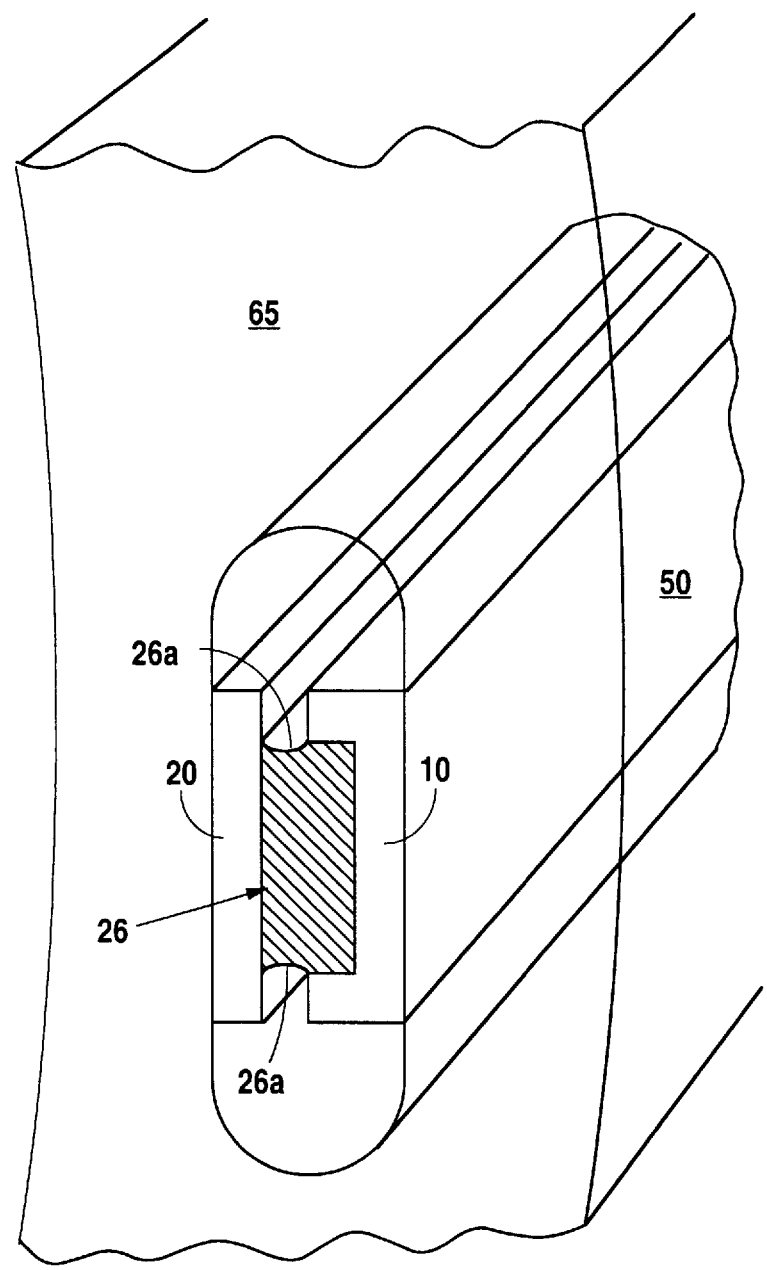
FIG. 10 is a cross-sectional view of the component parts of the alternative embodiment of the present invention in combination with an alternative embodiment of a spacer.

FIG. 10 depicts an alternative design for spacer 26. Here the spacer edges 26a are recessed so that when member 10 is forced into contact with member 20, spacer 26 cannot expand into airspaces 27 to prevent contact between members 10 and 20.

While it is preferred that the apparatus be installed by the vehicle manufacturer at the factory, it can also be added as an accessory at a dealership or purchased at an auto parts store and retro-fitted. Regardless of where it is fabricated, the component parts are all readily available and inexpensive.

In operation, when electrically conducting members 10 and 20 are in their open position no electrical current is supplied to the alarm 30. However when sufficient external force is applied to electrically conducting member 10 it elastically deforms. External force would occur either by an impact by or upon the vehicle with another object. When sufficient deformation of member 10 occurs and member 10 contacts member 20 the members are now in their contacting position, thus closing the circuit and supplying electrical current to the alarm 30. Once current is applied to the alarm 30 it responds by emitting a discernible output, either visual, auditory or both. The alarm output should be noticeable to the vehicle operator so he or she can properly react to the collision. An auditory signal could emanate via an automobile horn as supplied by most automobile manufacturers. This can serve to warn not only the driver of the subject vehicle, but also drivers of other vehicles who impact upon the vehicle, or individuals who open their vehicle doors against the honk strip and activate the horn. A visual signal could consist of a flashing light positioned inside the automobile and easily noticeable by the driver of the vehicle.

In an alternative embodiment (not shown), the electrical circuit shown in FIG. 1 also includes a switch for selectively inactivating the apparatus of the present invention. The switch could, for instance, be positioned on the dashboard of the vehicle and is either wired in series with the main lead 13 to the battery or, in the case of the embodiment shown in FIG. 5, to a bridging strip with individual leads to each strip 50–53.

Those skilled in the art who have the benefit of this disclosure will recognize that other changes can be made to the component parts comprising the invention without changing the manner in which those parts function to achieve their intended result. All such changes which do not depart from the spirit of the present invention are intended to fall within the scope of the following claims.

What is claimed is:

1. An apparatus for indicating motor vehicle impact in combination with a motor vehicle comprising:

first and second elastically deformable, electrically conducting members positioned in close proximity and substantially parallel to each other when applied to the body of a motor vehicle;

an electrical power source in electrical communication with said first member;

an alarm in electrical communication with said electrical power source and said second member; and said first member being movable from a first position in close proximity to said second member and leaving an open circuit between said power source and said alarm to a second position contacting said second member and placing said power source and said alarm in electrical communication thus causing said alarm to produce a discernible signal, said contacting position occurring when an external force is applied to either of said first or said second members, the elasticity of said first and second members causing said first member to return to said first position in close proximity to said second member when the external force is removed therefrom.

2. The first and second electrically conducting members of claim 1, being comprised of adjacent, substantially parallel metal strips.

3. The apparatus of claim 1 additionally comprising a spacer positioned between said first and second members.

4. The first and second electrically conducting members of claim 1, being disposed in a casing.

5. The casing of claim 4 being comprised of a vehicle molding strip.

6. The first and second electrically conducting members of claim 1, being disposed on the outer periphery of a motor vehicle.

7. The apparatus of claim 1, wherein said alarm is comprised of an auditory response element.

8. The apparatus of claim 1, wherein said alarm is comprised of a visual response element.

9. An apparatus for indicating contact between a motor vehicle and another object comprising:

a first and a second electrically conducting member;

an electrical power source in electrical communication with said first member;

an auditory or a visual response element in electrical communication with said electrical power source and said second member;

said first and second members being positioned in a noncontacting first position in close proximity to each other leaving an open circuit between said power source and said response element, and a contacting position placing said power source and said response element in electrical communication thus causing said response element to produce a signal, said contacting position occurring when an external force is applied to either member; and said first and second members being comprised of adjacently parallel, elastically deformable metal strips and disposed in a flexible casing comprised of vehicle molding strips disposed on the outer periphery of a motor vehicle.

10. The apparatus of claim 9 additionally comprising a spacer positioned between said first and second members.

11. Apparatus for indicating an impact when mounted on a motor vehicle comprising:

first and second electrically conducting members mounted substantially parallel to each other on a motor vehicle;

an electrical power source in electrical communication with said first member;

an alarm in electrical communication with said second member and said electrical power source;

said first member being movable from a first position in close proximity to said second member and leaving an open circuit between said power source and said alarm to a second contacting position contacting said second member and placing said power source and said alarm in electrical communication thus causing said alarm to produce a discernible signal, said contacting position occurring when an external force is applied to either of said first or said second members; and a resilient spacer between said first and second members for returning said first member to said first position.

12. The apparatus of claim 11 wherein said first and second members are disposed in a casing on the motor vehicle.

13. The apparatus of claim 12 wherein said casing comprises a molding strip.

14. The apparatus of claim 11 wherein said alarm is comprised of an auditory signal response element.

15. The apparatus of claim 11 wherein said alarm is comprised of a visual signal response element.

16. The apparatus of claim 11 wherein said first and second members are comprised of metal strips.

17. The apparatus of claim 16 wherein said first and second members are additionally comprised of a resilient material.

* * * * *